United States Patent
Tanaka et al.

(10) Patent No.: US 7,435,308 B2
(45) Date of Patent: Oct. 14, 2008

(54) ROLLING BEARING

(75) Inventors: Susumu Tanaka, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 373 days.

(21) Appl. No.: 11/138,413

(22) Filed: May 27, 2005

(65) Prior Publication Data

US 2006/0266440 A1    Nov. 30, 2006

(51) Int. Cl.
*F16C 33/62* (2006.01)
*C22C 38/00* (2006.01)
*C22C 38/34* (2006.01)

(52) U.S. Cl. .................. 148/906; 384/625; 384/912

(58) Field of Classification Search .................. 148/906; 384/912, 625
See application file for complete search history.

(56) References Cited

FOREIGN PATENT DOCUMENTS

| JP | 60-194047 A | 10/1985 |
| JP | 62-218542 A | 9/1987 |
| JP | 1-306542 A | 12/1989 |
| JP | 403153842 | * 7/1991 |
| JP | 4-280941 A | 10/1992 |
| JP | 7-72565 B2 | 8/1995 |
| JP | 8-81710 A | 3/1996 |
| JP | 409087740 | * 3/1997 |
| JP | 2724019 B2 | 11/1997 |
| JP | 11-315351 A | 11/1999 |
| JP | 2000204445 | * 7/2000 |
| JP | 2002-521571 A | 7/2002 |
| JP | 2004176156 | * 6/2005 |
| WO | 00/06790 | 2/2000 |
| WO | 01/18273 A1 | 3/2001 |

* cited by examiner

*Primary Examiner*—Susy Tsang-Foster
*Assistant Examiner*—Nicholas A. Smith
(74) *Attorney, Agent, or Firm*—Sughrue Mion, PLLC

(57) ABSTRACT

An inner ring 2 and an outer ring 3 of a rolling bearing 1 are made from steel that contains carbon in the range of 0.65 to 1.25% by mass, silicon in the range of 0.7 to 2.5% by mass, manganese in the range of 0.1 to 1.5% by mass, chromium in the range of 0.5 to 3.0% by mass, 1.5% by mass or less of molybdenum, 9 ppm or less of oxygen, 30 ppm or less of titanium, and 80 ppm or less of sulfur, and whose rating number of the Thin type A series inclusion is 1.5 or less and that of the Heavy type A series inclusion is 1.0 or less when the rating numbers are measured by a method stipulated in ASTM E45.

2 Claims, 1 Drawing Sheet

ROLLING BEARING

BACKGROUND OF THE INVENTION

1. Field of the Invention

The present invention relates to a rolling bearing that can have a long lifetime even when it is used under an environment where high load, high vibration and high temperature are applied. In particular, a rolling bearing that can be preferably used in engine auxiliaries (such as an alternator, an electromagnetic clutch, an inclusion pulley, a car air-conditioner compressor, and a water pump) and gas heat pumps.

2. Description of Background Art

Generally, in the rolling bearing, a tumbling motion is carried out between a track ring and rolling elements that constitute members thereof, and the track ring and the rolling elements are repeatedly put under stress. Accordingly, it is demanded that materials constituting these members are characterized to be hard, be able to stand a load, have a long rolling fatigue life, and have excellent wear resistance against sliding.

In this connection, in general, as a material constituting these members, high carbon and chromium bearing steel such as SUJ2 or the like is preferably used. In order to obtain necessary physical properties such as the hardness, wear resistance and rolling fatigue life, the bearing steel are subjected to hardening and tempering, and thereby the hardness thereof becomes in range of HRC 58 to 64.

However, in accordance with a recent trend in miniaturization and lighter weight of automobiles, miniaturization and lighter weight of the engine auxiliaries are also demanded. Furthermore, it is also demanded to be high performance and high output power. Accordingly, for example, in the case of an alternator, when an engine is activated, high vibration and high load (substantially 4 to 20 G) accompanying a high-speed rotation are applied through a belt on a rolling bearing and at the same time the rolling bearing becomes high-temperature state. This causes an early exfoliation in an outer ring that is a fixed ring to make the lifetime of the rolling bearing shorter. Furthermore, in the case of an electromagnetic clutch and an inclusion pulley, for example, the early exfoliation is generated in an inner ring that is a fixed ring to make the lifetime of the rolling bearing shorter.

It is considered that the early exfoliation is caused by a mechanism mentioned below:

(1) high load, high vibration, rotary motion and high temperature make it difficult to form an oil film and thereby a track surface readily comes into contact with a rolling element;

(2) a lubricant or moisture contained in the lubricant is decomposed by a catalysis action on an activated newly born surface in a contact surface between the track ring and the rolling element and a hydrogen ion is generated; and (3) the generated hydrogen ion is absorbed by the newly born surface, and the hydrogen ion becomes a hydrogen atom and is accumulated in a high strain field (in proximity to a maximum shearing stress position), followed by undergoing a structural change into a structure called a white structure. This structural change causes the exfoliation. Furthermore, it is also considered that a discharge phenomenon occurring between the inner ring and the outer ring contributes in accelerating the early exfoliation accompanying a structural change mentioned above. In other words, in an alternator, for example, high-speed rotation movement transmitted from a crankshaft of the engine generates static electricity between a belt and a pulley. The place between the inner ring and the outer ring during rotation is, in ordinary cases, rendered an insulated state owing to an oil film of lubricant. However, when the difference in the electrical potential between the inner ring and the outer ring becomes large (substantially 100 to 500V), a discharge phenomenon occurs between the inner ring and the outer ring. Owing to the discharge phenomenon, grease that is lubricant or moisture contained in the grease is decomposed to generate the hydrogen ion, which becomes the hydrogen atom and penetrates from a track surface to cause the structural change as mentioned above.

As background arts that intend to increase the lifetime of a bearing used under high load and high vibration as mentioned above, for instance, There are Japanese Patent Unexamined Publication JP-B-07-72565 (hereinafter, referred to as reference 1), Japanese Patent Examined Publication JP-B-2724019 (hereinafter, referred to as reference 2), and Japanese Patent Unexamined Publication JP-A-62-218542 (hereinafter, referred to as reference 3).

In reference 1, it is described that by making an amount of retained austenite in steel constituting an outer ring on a load input side or a pulley side in range of 0.05 to 0.06%, a plastic deformation caused by the decomposition of the retained austenite under the track surface can be inhibited and the vibration can be reduced. Furthermore, in reference 2, heat-resistant bearing steel containing predetermined amounts of alloy contents (C, Si, Mn, Cr, and Mo) is disclosed. Still furthermore, in reference 3, it is described that the track ring of the bearing is constituted of steel containing predetermined amounts of alloy contents (C, Si, Mn, and Cr) with an amount of the retained austenite of 8% or less, and the surface hardness is made HRC 60 or more.

However, when only an amount of the retained austenite is made smaller like in the reference 1, though an effect of improving the dimensional stability under a high-temperature environment can be achieved, there is observed no life lengthening effect against the early exfoliation caused by penetration of hydrogen mentioned above.

Furthermore, in the reference 2, by adding elements such as Si and Mo that increase the tempering softening resistance of steel, the hardness that can stand the rolling fatigue is preserved even under high temperature environment. However, since the early exfoliation caused by a penetration of hydrogen is not considered at all, it is impossible to expect a life lengthening effect.

Still furthermore, according to the reference 3, by tempering with the addition of the elements such as Si and Al that increase the tempering softening resistance of steel, an amount of the retained austenite is made 8% or less. Accordingly, it is possible to obtain the track ring whose year-to-year change in dimension is small even under a high temperature environment. However, as well as the reference 2, since there is no consideration of the early exfoliation caused by hydrogen penetration, the life lengthening effect cannot be expected.

Thus, in all of the references, there are no considerations of the early exfoliation caused by a structural change into a white structure. Accordingly, a sufficient life lengthening effect cannot be expected.

SUMMARY OF THE INVENTION

Accordingly, the present invention intends to overcome such problems of the background arts and to provide a rolling bearing that has a long lifetime even under an environment where high load, high vibration and high temperature are applied.

In order to solve the problems, according to a first aspect of the present invention, there is provided a rolling bearing comprising:

an inner ring and an outer ring; and a plurality of rolling elements rollably disposed between the inner ring and the outer ring, wherein at least one of the inner ring and the outer ring being made of steel, the steel including:

carbon in the range of 0.65 to 1.25% by mass;
silicon in the range of 0.7 to 2.5% by mass;
manganese in the range of 0.1 to 1.5% by mass;
chromium in the range of 0.5 to 3.0% by mass;
molybdenum of 1.5% by mass or less;
oxygen of 9 ppm or less;
titanium of 30 ppm or less;
sulfur of 80 ppm or less;
rating number of Thin type A series inclusion of 1.5 or less and rating number of Heavy type A series inclusion of 1.0 or less, and wherein the rating numbers are measured by a method stipulated in ASTM (American Society For Testing and Materials) E45.

According to a second aspect as set forth in the first aspect of the present invention, it is preferable that the steel includes retained austenite of 4% by volume or less.

As the rolling bearing according to the present invention has a track ring that is made of steel in which silicon, chromium, molybdenum and so on are alloyed, it has excellent heat resistance. Furthermore, as amounts of sulfur and the A series inclusion in the steel are small, the early exfoliation is hardly occurred which is generated by a structural change into a white structure owing to the penetration of hydrogen. Accordingly, the rolling bearing according to the present invention has a long lifetime even when it is used under an environment where high load, high vibration and high temperature are applied (for example, in the engine auxiliaries, 180° C. or more).

In followings, each of elements added to steel or the like in the present invention will be described.

[Carbon]

Carbon (C) has a function of forming a solid solution in a base material to make the hardness after the quenching and tempering increase to increase the strength.

When a content of carbon is less than 0.65% by mass, an amount of carbon forming a solid solution in the base material is deficient and sufficient strength becomes impossible to secure after the quenching and tempering. On the other hand, when the content of carbon exceeds 1.25% by mass, coarse eutectic carbide is likely to be generated during steel making to largely damage in some cases the fatigue life and the strength. Furthermore, in some cases, the cold workability as well as machinability is deteriorated to cause an increase in the cost.

[Silicon]

Silicon (Si) is an element necessary as a deoxidizing agent during steel making. It is also an agent effective in increasing the tempering properties and strengthening martensite of the base material to improve the bearing lifetime. Furthermore, it has also a function of enhancing the tempering softening resistance, the dimensional stability and the heat resistance. In order to make the functions exhibit sufficiently, it is necessary to make a content of silicon 0.7% by mass or more. However, when the content exceeds 2.5% by mass, in some cases, the machinability, the forgeability and the cold workability are deteriorated.

[Manganese]

Manganese (Mn) is an element necessary as a deoxidizing agent during steel making similarly to Si, and content thereof is necessary to be 0.1% by mass or more. It also has a function to form a solid solution in the base material to increase the tempering properties. However, when it is added excessively, not only the cold workability and machinability are deteriorated but also the temperature at which martensitic transformation begins is lowered due to an increase in an amount of the retained austenite, in some cases sufficient strength becomes incapable of obtaining. Accordingly, the content of manganese is necessary to be 1.5% by mass or less.

[Chromium]

Chromium (Cr) has a function of forming a solid solution in the base material to increase the quenching properties, the tempering softening resistance, and the corrosion resistance. It also has a function of advancing the spheroidization of carbide. Furthermore, it has a function of forming fine carbide to inhibit grains from becoming coarse during heat treatment and of enhancing the fatigue life property, the wear resistance and the heat resistance.

In order to let such functions exhibit sufficiently, it is necessary to make the content of chromium 0.5% by mass or more. However, when the content of chromium is too much, in some cases the productivity of a steel product or the cold workability as well as the machinability during the manufacture of bearings deteriorates to provoke a marked increase in cost. In addition to this, when the content of carbon increases, in some cases coarse carbide is generated to damage the fatigue life as well as the strength seriously. Accordingly, it is necessary to make the content of chromium 3.0% by mass or less.

[Molybdenum]

Molybdenum (Mo) has a function of forming a solid solution in a base material to enhance the quenching properties, the tempering softening resistance, and the corrosion resistance similarly to Cr. Furthermore, it has a function of forming fine carbide to inhibit grains from becoming coarse during the heat treatment and to enhance the fatigue life property as well as the wear resistance. Accordingly, it is selectively added in consideration of the service temperature as well as life durability of the bearing.

However, when molybdenum is added excessively, in some cases the productivity of the steel product or the cold workability and the machinability while the bearing is manufactured is deteriorated to cause a remarkable increase in cost. Accordingly, it is necessary to make the upper limit of the content of molybdenum 1.5% by mass.

[Oxygen and Titanium]

Oxygen (O) as well as Titanium (Ti) is an impurity in steel and forms an oxide inclusion such as $Al_2O_3$ or a nitride inclusion such as TiN to deteriorate the lifetime of the bearing. Accordingly, the contents of both are preferably small, and it is necessary that the content of O is 9 ppm or less, and that of Ti is 30 ppm or less.

[Sulfur and the A Series Inclusion]

Sulfur (S) is an impurity in steel and generally exists as an A series inclusion such as MnS in steel. As the A series inclusion works as a chip breaker and has a function of enhancing the machinability of steel, it is often used effectively. Furthermore, up to now, it has been considered that the A series inclusion, unlike the B series inclusion and the D series inclusion, hardly affects on the lifetime of a bearing.

However, when a bearing is used under an environment where particular conditions such as high temperature, high load, high vibration and high-speed are satisfied, in a contact surface of the track ring and the rolling element, lubricant or moisture contained in the lubricant is decomposed to generate hydrogen and the hydrogen penetrates rapidly into steel to drastically deteriorate the lifetime thereof in some cases. This is because, as discussed previously, penetrated hydrogen is accumulated in a high-strain field to deteriorate the proof stress of steel, which causes a structural change into a structure called white structure accompanying a local plastic flow.

The present inventors discovered that when, among the A series inclusion, the rating number of a Heavy type A series inclusion owing to a method stipulated in ASTM E45 is made 1.0 or less, it is possible to improve the lifetime of the bearing against the early exfoliation caused by a peculiar structural change mentioned above.

Though the A series inclusion works as a hydrogen absorption site, as the bonding force thereof with hydrogen is weak, it releases hydrogen in a field where great shearing stress works. Accordingly, when an amount of the A series inclusion in steel is large, it becomes easy for the white structure to generate, resulting in making the lifetime of the bearing shorter. In order to make the bearing longer in the lifetime, it is necessary to make an amount of S 80 ppm or less (preferably 50 ppm or less) and that of a sulfide that is an A series inclusion lower.

Furthermore, the bigger a dimension of the A series inclusion becomes, the larger an amount of absorbed hydrogen becomes. In addition to this, since the A series inclusion is soft and does not have strength enough to bear the shearing stress, the sharing stress per unit area operating on a structure in the proximity of the A series inclusion becomes larger to make the plastic flow easier and the white structure becomes easier to generate. Accordingly, it is necessary to make the rating number of the Thin type A series inclusion and that of the Heavy type A series inclusion that are measured by a method stipulated particularly in ASTM E45 1.5 or less and 1.0 or less, respectively. More preferably, the rating number of the Thin type A series inclusion and that of the Heavy type A series inclusion that are measured by a method stipulated in ASTM E45 are made 1.0 or less and 0.5 or less, respectively.

[Retained Austenite]

In ordinary cases, after the quenching and tempering, bearing steel contains retained austenite (γR) in the range of 8 to 12% by volume. The γR is easily decomposed when a bearing is used under a high temperature, upon decomposing a dimension of the bearing expands, thereby blocking up of the gaps and falling of the sphericity are caused, resulting in malrotation and heat-seizure in some cases. Accordingly, it is preferable to make the γR 4% by volume or less by applying the tempering at a high temperature, for example, in the range of 260 to 320 degrees centigrade after quenching. In the present invention, since the steel contains proper amounts of C, Si, Cr and so on, it is possible to secure enough hardness during the tempering at a high temperature. In addition to this, from a viewpoint of the rolling fatigue life, it is preferable to make the hardness of the track ring HRC 59 or more.

DETAILED DESCRIPTION OF THE PREFERRED EMBODIMENTS

Figure 1:
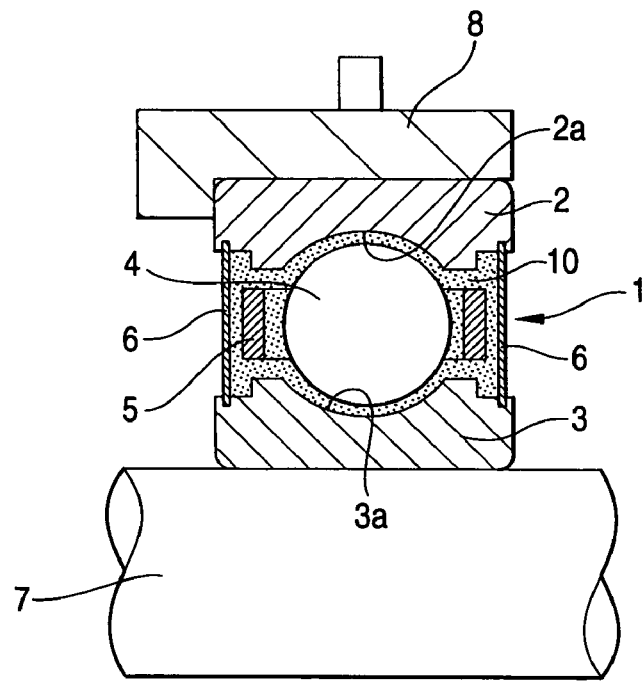
FIG. 1 is a sectional view showing a structure of a deep groove ball bearing that is an embodiment of a rolling bearing involving the present invention.

In followings, embodiments of the rolling bearings according to the present invention will be described in detail with reference to the drawings. FIG. 1 is a sectional view showing a structure of a rolling bearing that is an embodiment of the present invention.

The rolling bearing 1 is a deep groove ball bearing in accordance with JIS (Japanese Industrial Standards) bearing number 6303 wherein an outer ring 2 is fixed to a housing 8 to form a fixed ring and an inner ring 3 is externally engaged with a shaft 7 to form a rolling ring. In addition to this, between a track surface 2a of the outer ring 2 and a track surface 3a of the inner ring 3, a plurality of rolling elements 4 held by a retainer 5 is placed with sealing members 6 and 6 fitted between the outer ring 2 and the inner ring 3 on both sides of the retainer 5.

Furthermore, in a space surrounded by the sealing members 6 and 6, grease 10 is encapsulated. In the rolling bearing 1, the inner ring 3 rolls along with a revolution of a shaft 7 and the load and vibration caused by this rotation operates from the shaft 7 through the inner ring 3 and the rolling elements 4 to a load sphere of the outer ring 2.

The inner and outer rings 2 and 3 are constituted of steel products whose compositions are shown in Table 1 (A1 through A9) and manufactured in the following way. That is, the inner and outer rings 2 and 3 are manufactured by quenching steel products molded in a predetermined dimension at a temperature in the range of 830 to 880° C., followed by tempering at a temperature in the range of 260 to 320° C., further followed by applying finishing by grinding.

Furthermore, the surface roughness of the track surface 2a and the track surface 3a is in the range of substantially 0.01 to 0.03 μm. In addition to this, the rolling elements 4 are the steel balls made of SUJ2 corresponding to grade 20. Furthermore, the rating number of the A series inclusion was measured according to a following way by use of the outer ring 2. That is, the outer ring 2 was fractured perpendicular to a rolling direction, 300 mm$^2$ of a cross section thereof was observed and evaluated of the worst field of view by use of a microscope eye piece whose field of view is 0.80 mm in diameter.

TABLE 1

| Kind of steel | C % by mass | Si % by mass | Mn % by mass | Cr % by mass | Mo % by mass | O ppm | Ti ppm | S ppm | Rating number (1) | |
|---|---|---|---|---|---|---|---|---|---|---|
| | | | | | | | | | Thin | Heavy |
| A1 | 1.04 | 1.21 | 0.10 | 0.97 | — | 9 | 14 | 10 | 1.0 | 1.0 |
| A2 | 1.01 | 2.50 | 0.51 | 1.51 | — | 8 | 12 | 30 | 1.0 | 0.5 |
| A3 | 1.02 | 0.70 | 1.50 | 1.50 | — | 8 | 11 | 80 | 1.5 | 1.0 |
| A4 | 0.65 | 1.01 | 0.64 | 0.50 | 1.00 | 9 | 13 | 20 | 0.5 | 0.0 |
| A5 | 1.25 | 0.99 | 0.72 | 1.49 | — | 6 | 10 | 30 | 0.5 | 0.0 |
| A6 | 0.95 | 1.00 | 0.65 | 3.00 | — | 9 | 14 | 20 | 1.0 | 0.5 |
| A7 | 1.01 | 1.01 | 0.42 | 1.40 | — | 7 | 10 | 50 | 1.5 | 1.0 |
| A8 | 1.01 | 1.00 | 0.48 | 1.46 | 1.00 | 8 | 15 | 30 | 0.5 | 0.0 |
| A9 | 1.00 | 0.98 | 0.49 | 1.51 | 1.50 | 9 | 17 | 30 | 1.0 | 0.5 |
| B1 | 1.01 | 0.27 | 0.41 | 1.47 | — | 8 | 12 | 100 | 2.0 | 1.5 |

TABLE 1-continued

| Kind of steel | C % by mass | Si % by mass | Mn % by mass | Cr % by mass | Mo % by mass | O ppm | Ti ppm | S ppm | Rating number (1) Thin | Rating number (1) Heavy |
|---|---|---|---|---|---|---|---|---|---|---|
| B2 | 0.99 | 0.26 | 0.43 | 1.50 | — | 8 | 13 | 80 | 1.5 | 1.5 |
| B3 | 1.01 | 0.26 | 0.41 | 1.49 | — | 9 | 14 | 50 | 2.0 | 1.5 |
| B4 | 1.01 | 1.01 | 0.42 | 1.49 | — | 9 | 14 | 90 | 2.0 | 1.5 |
| B5 | 1.01 | 1.00 | 0.41 | 1.51 | — | 9 | 14 | 50 | 2.0 | 1.5 |

(1) The rating number of the Thin type A series inclusion and that of the Heavy type A series inclusion Next, in the deep groove ball bearings with the compositions as discussed above, lifetimes thereof were evaluated. In the deep groove ball bearing, as is shown by the Tables 2 and 3, the inner ring and the outer ring are made of steel materials shown in the Table 1 (A1 through A9, and B1 through B5). The tempering temperatures thereof were in the following ranges: for the bearings according to the examples 1 through 9, in the range of 260 to 320° C.; for the bearing according to the comparative examples 1 through 10, in the range of 160 to 180° C., in the range of 220 to 240° C., or in the range of 260 to 320° C.

TABLE 2

|  | Kind of steel | Tempering temperature (° C.) | Surface hardness HRC | γR (% by volume) | $L_{10}$ Life time (hr) | Rate of change in dimension (%) |
|---|---|---|---|---|---|---|
| Example 1 | A1 | 260 to 320 | 60.1 | 0 | 833 | 0.01 |
| Example 2 | A2 | 260 to 320 | 62.2 | 2 | 1000 | 0.01 |
| Example 3 | A3 | 260 to 320 | 59.3 | 0 | 899 | 0.01 |
| Example 4 | A4 | 260 to 320 | 59.7 | 0 | 1000 | 0.01 |
| Example 5 | A5 | 260 to 320 | 62.4 | 0 | 1000 | 0.01 |
| Example 6 | A6 | 260 to 320 | 61.3 | 3 | 1000 | 0.01 |
| Example 7 | A7 | 260 to 320 | 60.9 | 0 | 943 | 0.01 |
| Example 8 | A8 | 260 to 320 | 61.8 | 3 | 1000 | 0.01 |
| Example 9 | A9 | 260 to 320 | 62.3 | 4 | 1000 | 0.01 |

Figure 2:
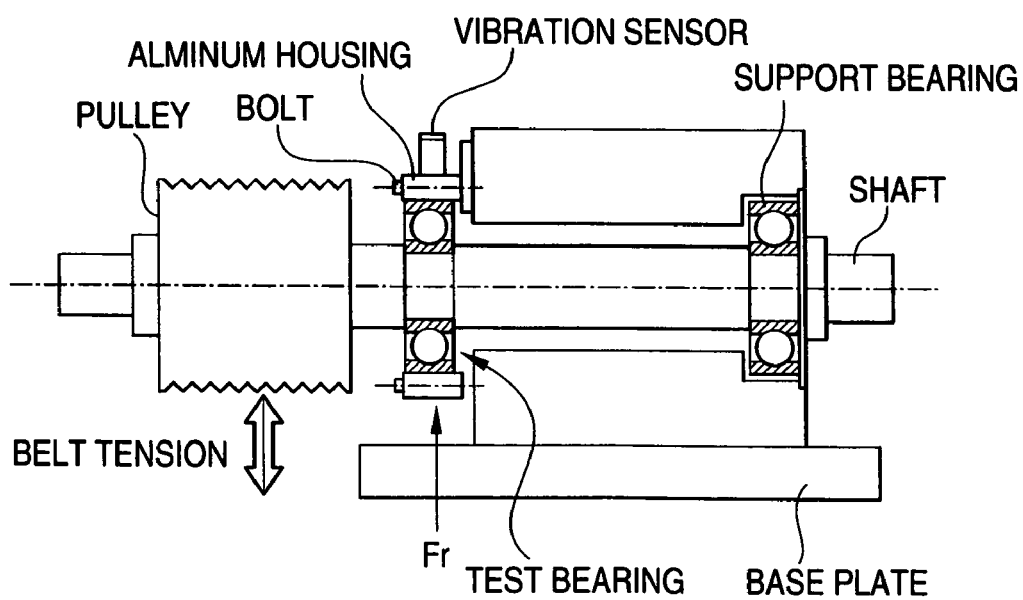
FIG. 2 is a schematic diagram showing a structure of a test machine used in the grease lubricant lifetime test.

Assuming that the bearings are used in the engine auxiliaries, the evaluation of the lifetime was carried out according to grease lubrication life test wherein a test machine shown in FIG. 2 was used. The grease lubrication life test is preferable since it can simulate the early exfoliation caused by a structural change to a white structure owing to the penetration of hydrogen.

The test conditions were as follows: firstly, a test temperature was set in the range of 60 to 80° C.: secondly, the rotation speed of the bearings was switched interchangeably between 9000 min$^{-1}$ and 18000 min$^{-1}$ every predetermined time for example, every 9 seconds (as a rapid acceleration/deceleration test). Furthermore, the loading condition was P/C=0.1 (wherein P represents dynamic equivalent load and C represents basic dynamic rating load), and as a lubricant, urea base grease (the kinetic viscosity of the base oil at 40° C. is 47.3 mm$^2$/s) was used.

The lifetime test was carried out of 10 pieces for every one kind of bearing, and thereby the $L_{10}$ lifetime was measured. The evaluation results of the $L_{10}$ lifetime are shown in the Tables 2 and 3. The stop time of the test was set at 1000 hours, and in the case that all of 10 test bearings did not reach the lifetime before the stop time of the test, the $L_{10}$ lifetime is shown as 1000 hours.

Furthermore, by carrying out a rotation test at a high temperature under such conditions that a temperature was 180° C., the rotation speed was 3000 min$^{-1}$, and the loading con-

TABLE 3

|  | Kind of steel | Tempering temperature (° C.) | Surface hardness HRC | γR (% by volume) | $L_{10}$ life time (hr) | Rate of change in dimension (%) |
|---|---|---|---|---|---|---|
| Comparative example 1 | B1 | 160 to 180 | 62.1 | 9 | 142 | 0.08 |
| Comparative example 2 | B1 | 220 to 240 | 58.8 | 1 | 162 | 0.02 |
| Comparative example 3 | B2 | 160 to 180 | 62.3 | 8 | 243 | 0.07 |
| Comparative example 4 | B2 | 220 to 240 | 58.9 | 0 | 278 | 0.01 |
| Comparative example 5 | B3 | 160 to 180 | 62.0 | 9 | 239 | 0.08 |
| Comparative example 6 | B3 | 220 to 240 | 58.7 | 1 | 241 | 0.02 |
| Comparative example 7 | B4 | 160 to 180 | 62.8 | 12 | 338 | 0.07 |
| Comparative example 8 | B4 | 260 to 320 | 61.2 | 1 | 390 | 0.01 |
| Comparative example 9 | B5 | 160 to 180 | 62.6 | 11 | 378 | 0.07 |
| Comparative example 10 | B5 | 260 to 320 | 60.7 | 0 | 402 | 0.01 | dition was P/C=0.1, and thereby the rate of change in dimension of the outer ring was measured. By testing 3 pieces for every one kind of bearing, the rate of change in dimension was measured. The results thereof are shown in the Tables 2 and 3. Furthermore, in the Tables 2 and 3, the hardness HRC and the amounts of the retained austenite (γR) of the track surfaces of the outer rings are shown in addition.

As is obvious from Tables 2 and 3, though tempered at such a high temperature as from 260 to 320° C., each of the bearings of examples 1 through 9 had such high hardness as 59 or more in the surface hardness HRC and longer lifetime than that of any one of comparative examples 1 through 10. Furthermore, the rate of change in dimension after the rotating test at a high temperature was very small. In particular, the track rings of examples 4, 5 and 8 where the rating number of the Heavy type A series inclusion was 0.0 suffered no breakage at all even after 1000 hours of the grease lubricant lifetime test.

On the other hand, comparative examples 1 through 6 were comparative examples wherein conventional SUJ2 was used. Since the rating numbers of both types of the A series inclusion contained were larger than any one of those of the examples, irrespective of the tempering temperature, these had shorter lifetime than the respective examples. In particular, the comparative examples 5 and 6, though containing S at an amount of 80 ppm or less had short lifetime. Accordingly, it can be considered that an absolute amount of sulfide is not the only factor to determine the lifetime of a bearing and an amount of particularly large sulfide is also a factor of lowering the lifetime.

Furthermore, comparative examples 7 through 10 are made of steel kinds B4 and B5 containing alloy components similar to that of steel kind A7 constituting example 7. However, since the rating numbers of the A series inclusion thereof are larger, these had shorter lifetime than that of any one of the examples.

Meanwhile, the embodiment shows only one example of the present invention, however the present invention is not restricted to the embodiment. For example, in the embodiment, a deep groove ball bearing is exemplified as a rolling bearing. However, it goes without saying that the rolling bearing of the present invention can be applied to any of various other kinds of rolling bearings. The examples includes the radial type rolling bearings such as an angular ball bearing, a self-aligning ball bearing, a cylindrical roller bearing, a tapered roller bearing, a needle-roller bearing and a self-aligning roller bearing, and thrust type rolling bearings such as a thrust ball bearing and a thrust roller bearing.

Furthermore, the rolling bearings according to the embodiment have a long lifetime under an environment where high load, high vibration and high temperature are applied like in the engine auxiliaries; however, it goes without saying that the present rolling bearings also have an excellent lifetime under other environments.

As described above, since a rolling bearing according to the present invention is made of steel that has a predetermined alloy components and is less in an amount of the A series inclusion, it is difficult for the early exfoliation caused by a structural change into a white structure owing to the penetration of hydrogen to occur. Accordingly, the rolling bearing according to the present invention has a longer lifetime even when it is used under an environment where high load, high vibration and high temperature are applied.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A rolling bearing comprising:
    an inner ring and an outer ring; and
    a plurality of rolling elements rollably disposed between the inner ring and the outer ring,
    wherein at least one of the inner ring and the outer ring being made of steel, the steel including:
    carbon in the range of 0.95 to 1.25% by mass;
    silicon in the range of 0.7 to 2.5% by mass;
    manganese in the range of 0.1 to 1.5% by mass;
    chromium in the range of 0.5 to 3.0% by mass;
    molybdenum of 1.5% by mass or less;
    oxygen of 9 ppm or less;
    titanium of 30 ppm or less;
    sulfur of 80 ppm or less;
    rating number of Thin A series inclusion of 1.5 or less and rating number of Heavy A series inclusion of 1.0 or less,
    wherein the rating numbers are measured by a method stipulated in ASTM E45, and
    wherein hardness of the inner ring and the outer ring are HRC 59 or more.

2. The rolling bearing according to claim 1, wherein the steel includes retained austenite of 4% by volume or less.

* * * * *